United States Patent [19]
Kelver

[11] 3,836,181
[45] Sept. 17, 1974

[54] CLEAT FOR JOINING DUCT WORK

[76] Inventor: Donn E. Kelver, Rte. 3, Box 264, La Porte, Ind. 46350

[22] Filed: June 7, 1973

[21] Appl. No.: 367,717

[52] U.S. Cl. ................................ 285/55, 285/424
[51] Int. Cl. ............................................. F16l 59/16
[58] Field of Search ............ 285/424, 55, 417, 369, 285/47, 48, 54, 149

[56] References Cited
UNITED STATES PATENTS
| | | | |
|---|---|---|---|
| 1,935,690 | 11/1933 | Zack | 285/424 X |
| 2,916,054 | 12/1959 | Callan | 285/424 X |
| 3,246,918 | 4/1966 | Burghart | 285/424 X |

Primary Examiner—Richard J. Scanlan, Jr.

[57] ABSTRACT

A cleat which is used for joining ducts and which includes S-shaped folds for accommodating the marginal portions of the duct walls. The cleat includes a leg which projects from the S-shaped folded portion of the cleat and which terminates in a generally right angular flange. The leg and right angular flange serve as strengthening members for the cleat and can be utilized to accommodate the edge portion of an insulative or similar type liner extending along the interior of the ducts.

6 Claims, 4 Drawing Figures

PATENTED SEP 17 1974  3,836,181

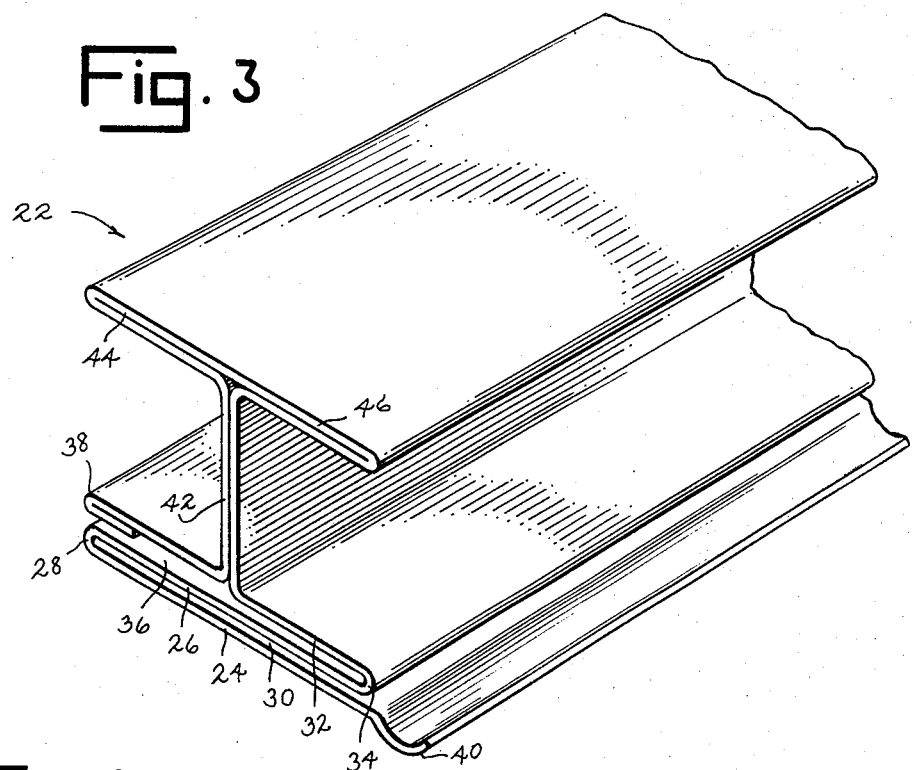
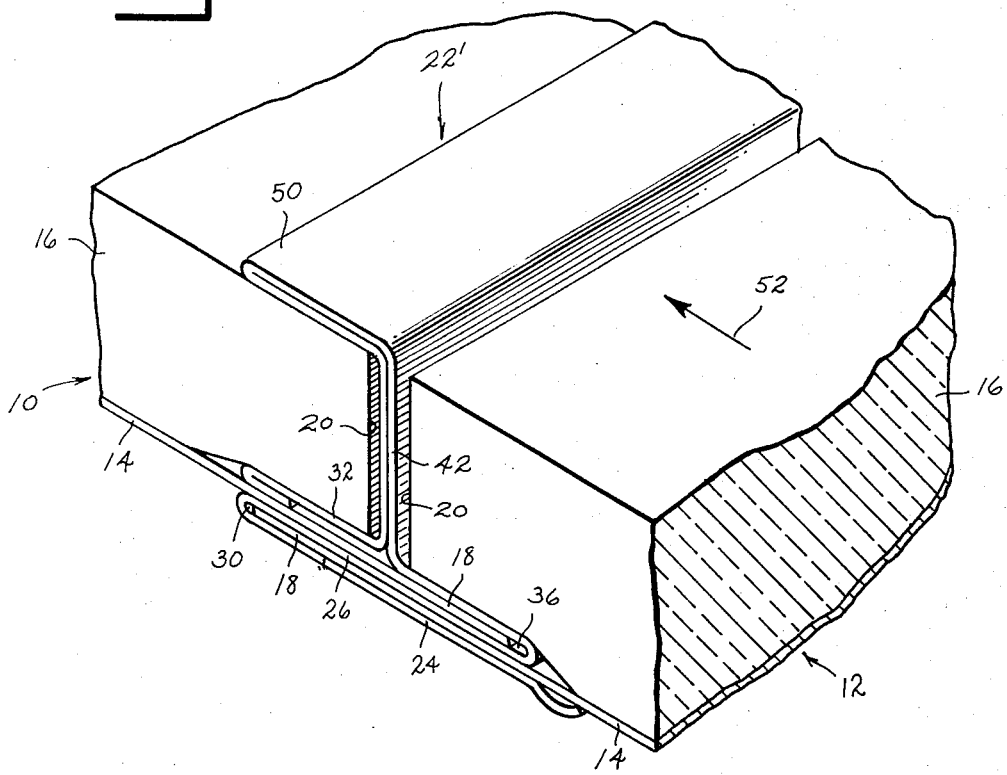

CLEAT FOR JOINING DUCT WORK

SUMMARY OF THE INVENTION

This invention relates to a cleat used for joining two ducts positioned in an end-to-end relationship.

The cleat of this invention includes an S-shaped part which accommodates the marginal edge portions of two end-to-end positioned ducts. A leg part projects outwardly from the S-shaped part of the cleat and terminates in at least one and preferably two oppositely extending flanges which, in cooperation with the leg part and a portion of the S-shaped part of the cleat, form means for accommodating an insulative or other type inner liner which constitutes a part of each of the ducts.

The utilization of the above described cleat leg part measurably increases the strength of the cleat relative to longitudinal flexing or bending over the standard S-type cleat and the standard standing S-type cleat presently being used. Additionally, the cleat of this invention can be used with insulated as well as uninsulated duct work. A problem heretofore present when utilizing air ducts having an inner loosely fibered insulative liner was the erosive effect the air had upon the inner exposed edges of the insulative liner. The air as it passed through the ducts contacted the exposed edges of the insulative liner where the ducts were joined, causing erosion and flaking of the liner. When utilizing the cleat of this invention, the leg part and its terminal flanges protect one or more of the exposed edges of the insulative liner from the air, thus substantially eliminating erosion of the liner edges.

Accordingly, it is an object of this invention to provide a cleat of economical construction and superior strength for joining duct work.

Another object of this invention is to provide a cleat for joining ducts having insulative inner liners and for protecting the edges of the insulative liners where the ducts are joined from the erosive effect of air or a similar gas passing over the liners.

Other objects of this invention will become apparent upon a reading of the invention's description.

BRIEF DESCRIPTION OF THE DRAWINGS

FIG. 3 is a fragmentary perspective view of the cleat shown in FIG. 1.

FIG. 4 is a fragmentary perspective view of a modified embodiment of the cleat of this invention shown joining two ducts.

DESCRIPTION OF THE PREFERRED EMBODIMENTS

Figure 1:
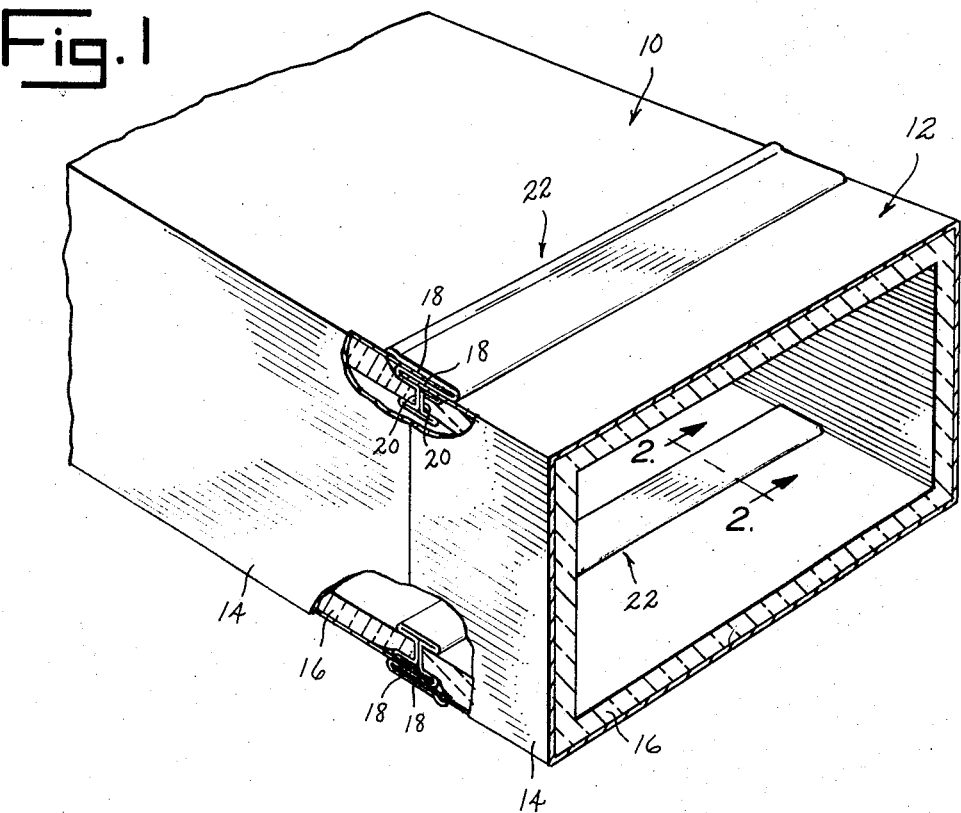
FIG. 1 is a perspective view of two ducts joined together by one embodiment of the cleat of this invention and shown with portions broken away to better illustrate the structural functionality of the cleat.

The illustrated embodiments are not intended to be exhaustive or to limit the invention to the precise forms disclosed. They are chosen and described in order to best explain the principles of the invention and its application and practical use to thereby enable others skilled in the art to best utilize the invention.

Reference numerals 10 and 12 refer to ducts each having a four-sided outer wall 14, generally formed of galvanized sheet metal, and an inner liner 16. Ducts 10 and 12 are similar in cross sectional size and shape. The upper and lower sides of each duct 10 and 12 include upper and lower end portions 18 which project beyond the ends 20 of liner 16. Liner 16 may be joined to the inner surface of the outer wall 14 of each duct 10 and 12 by gluing or other type of securement means and may consist of an insulative fiber material such as Fiberglas. Additionally, the thickness of liner 16 can vary, depending upon the operational conditions intended for the ducts.

Figure 2:
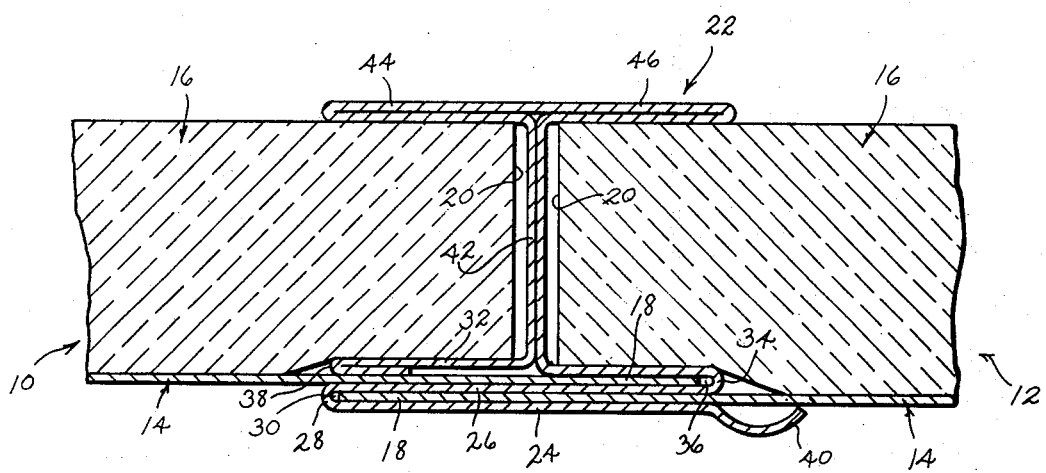
FIG. 2 is an enlarged fragmentary sectional view taken along line 2—2 of FIG. 1.

Cleats 22, forming one embodiment of this invention and illustrated in FIGS. 1–3, join ducts 10 and 12 at their end portions 18. As best seen in FIG. 3, each cleat 22 includes an outer fold 24, a middle fold 26 joined by a bend 28 to outer fold 24 and bent thereover to form a channel 30 between the folds. Each cleat 22 also includes an inner fold 32 which is joined to middle fold 26 by a bend 34 and which is bent thereover to form a channel 36 between the inner and middle folds. Free edge 38 of inner fold 32 may be bent against itself so as to provide strengthening for and to prevent wrinkling of fold 32. Free edge 40 of outer fold 24 is formed into a trough or bead to similarly strengthen fold 24.

Each cleat 22 includes a leg 42 which extends outwardly perpendicularly from inner fold 32 between bend 34 and fold edge 38. Leg 42 terminates in opposite coplanar flanges 44 and 46. It will be observed that outer fold 24, middle fold 26 and inner fold 32 are S-shaped in cross sectional configuration. Additionally, inner fold 32, leg 42 and flanges 44 and 46 are I-shaped in cross sectional configuration, thus adding strength along the longitudinal dimension of cleat 22. Each cleat 22 may be post-formed from sheet metal by a multiple bending operation, with leg 42 and flanges 44 and 46 as illustrated in the drawings being formed from a continuous multiple-bent intermediate section of cleat material. It would also be possible to manufacture cleats 22 by an extrusion process and from materials other than sheet metal, such as an extruded plastic material.

The aforedescribed cleat 22 can be installed by inserting an edge portion 18 of duct 12 snugly into channel 30 between outer fold 24 and middle fold 26 with end 20 of liner 16 fitting under flange 46 of the cleat. Similarly, an end portion 18 of duct 10 is fitted snugly into channel 36 between the middle fold 26 and outer fold 32 of the cleat with end 20 of the liner of duct 10 fitting snugly under flange 44 of the cleat. As is apparent from viewing the cleat and attached duct end portions 18 in FIG. 2, flanges 44 and 46 of the cleat will cause air or a similar gas when passing through the joined ducts to pass over the flanges, out of contact with the ends 20 of the duct inner liner 16, thus preventing erosion of the liner ends. Each cleat 22 preferably extends for substantially the entire width of the ducts with the ducts being joined to prevent their separation from cleats 22 by standard drive cleats (not shown) which are secured along the vertical sides of outer walls 14 of the ducts in a manner well known in the art.

A modified embodiment of the cleat of this invention is shown in FIG. 4. This cleat, designated by the reference numeral 22', is of a similar construction as cleat 22 above described in FIGS. 1–3, having an outer fold 24, middle fold 26, an inner fold 32 and a leg 42, with the exception that leg 42 terminates in a single flange 50 instead of opposite coplanar flanges 44 and 46.

Cleat 22' is installed with end portions 18 of ducts 10 and 12 fitting into channels 30 and 36 of the cleat. Leg 42 extends between ends 20 of liner 16 with downstream liner end 20 fitting under flange 50 of the cleat. Thus, air passing through ducts 10 and 12 in the direction of arrow 52 in FIG. 4 will be prevented from contacting the downstream end 20 of liner 16 due to the overlapping arrangement of leg 42 and flange 50, thereby serving to prevent erosion of the most vulnerable end edge of the duct liner.

It is to be understood that while cleats 22 and 22' have been shown with legs 42 thereof projecting interiorly of ducts 10 and 12, it would be possible to utilize the cleats with unlined ducts. In the case of unlined ducts, legs 42 of the cleats would project outwardly from the upper and lower sides of the ducts so that, as viewed in FIG. 2, end portion 18 of duct 10 would extend into channel 30 while end portion 18 of duct 12 would extend into channel 36 of cleat 22. In this situation, flanges 44 and 46 of cleat 22 would be positioned exteriorly of the ducts and would serve the singular function of strengthening the cleat along its longitudinal dimension.

It is to be understood that the invention is not to be limited to the details above given, but may be modified within the scope of the appended claims.

What I claim is:

1. A cleat for joining first and second ducts, said ducts having substantially similar quadrangular cross sectional shapes and positioned in an end-to-end relationship, each duct having an outer wall and a liner of selected material overlying the inner surface of said outer wall, the liner of each duct terminating in an end, the outer wall of each duct having an end portion extending beyond said end of its overlying liner, said cleat positioned between ducts and comprising an outer fold paralleling the longitudinal dimension of said cleat, a middle fold paralleling the longitudinal dimension of said cleat and joined at one longitudinal edge to one longitudinal edge of said outer fold and bent thereover to form a channel between said outer and middle folds, an inner fold paralleling the longitudinal dimension of said cleat and joined at one longitudinal edge to the opposite longitudinal edge of said middle fold and bent thereover to form a channel between said inner and middle folds, said inner and middle and outer folds having an S-shaped cross sectional configuration, a leg paralleling the longitudinal dimension of said cleat and projecting substantially perpendicularly from said inner fold between said one longitudinal edge and the opposite longitudinal edge of the inner fold, said leg terminating in a flange spacedly overlying said inner fold, the end portion of said first duct outer wall positioned in said channel between said outer and middle folds, the end portion of said second duct wall positioned in said channel between said inner and middle folds, the end of the liner of one of said first and second ducts fitted under said flange and over a portion of said inner fold.

2. The cleat of claim 1 wherein said leg terminates in a second flange, said first mentioned flange extending outwardly from one side of said leg, said second flange extending outwardly from the opposite side of said leg and overlying said inner fold, the end of the liner of the other of said first and second ducts fitted under said second flange and over a portion of said inner fold.

3. The cleat of claim 2 wherein said first mentioned and second flanges are coplanar with said leg and flanges and inner fold being I-shaped in cross section.

4. A cleat for joining first and second ducts, said ducts having substantially similar quadrangular cross sectional shapes and positioned in an end-to-end relationship, each duct having a wall, said cleat positioned between ducts and comprising an outer fold paralleling the longitudinal dimension of said cleat, a middle fold paralleling the longitudinal dimension of said cleat joined at one longitudinal edge to one longitudinal edge of said outer fold and bent thereover to form a channel between said outer and middle folds, an inner fold paralleling the longitudinal dimension of said cleat and joined at one longitudinal edge to the opposite longitudinal edge of said middle fold and bent thereover to form a channel between said inner and middle folds, said inner and middle and outer folds having an S-shaped cross sectional configuration, a leg paralleling the longitudinal dimension of said cleat and projecting substantially perpendicularly from said inner fold between said one longitudinal edge and the opposite longitudinal edge of the inner fold, said leg terminating in first and second oppositely extending coplanar flanges paralleling the longitudinal dimension of said cleat, said first flange overlying said inner fold at one side of said leg and said second flange overlying said inner fold at said opposite side of said leg, said inner fold and leg and first and second flanges having an I-shaped cross sectional configuration, the end portion of said first duct wall positioned in said channel between said outer and middle folds, the end portion of said second duct wall positioned in said channel between said inner and middle folds.

5. The cleat of claim 4 wherein said leg and first and second flanges are located exteriorly of said ducts.

6. The cleat of claim 4 wherein said ducts each include a liner of selected material overlying the inner surface of said duct's wall, said leg and first and second flanges being located interiorly of said ducts, the liner of said first duct fitted between said first flange and inner fold, the liner of said second duct fitted between said second flange and inner fold.

* * * * *